Patented July 3, 1951

2,559,083

UNITED STATES PATENT OFFICE 2,559,083

DECOLORIZATION OF POLYOLEFINIC HYDROCARBON DRYING OILS

Paul D. May, Galveston, and Leon M. Adams and Robert J. Lee, La Marque, Tex., assignors to Pan American Refining Corporation, Texas City, Tex., a corporation of Delaware No Drawing. Application May 28, 1948,
Serial No. 29,934

4 Claims. (Cl. 260—677)

This invention relates to the decolorization of hydrocarbon polyolefinic drying oils and it pertains more particularly to polyolefinic hydrocarbon drying oils of improved properties and to the method of obtaining such drying oils from polyolefinic hydrocarbons of high iodine number which are normally characterized by undesirably dark color and/or offensive odor.

An example of a polyolefinic hydrocarbon drying oil is the product obtained by hydrolizing the "complex" which is soluble in hydrogen fluoride and which is obtained by catalytic cracking of dearomatized gas oil with a hydrogen fluoride catalyst, the fraction of said product having a molecular weight range of about 200 to 350 being preferred. Somewhat similar oils may be obtained by hydrolizing aluminum chloride-hydrocarbon complexes, or as by-products of other acid acting catalysts used in hydrocarbon treating or conversion processes. Another example is the 200 to 350 molecular weight fraction of socalled "clay polymer" produced by the contacting of unrefined cracked gasoline vapors with an absorbent clay under conditions for removing and polymerizing diolefins, such process being generally known to the art as the "Gray process." Polyolefinic hydrocarbon drying oils of this general class are usually characterized by a dark color and by an offensive odor. An object of our invention is to provide improved method and means for decolorizing and/or deodorizing such drying oils without substantially changing the physical properties or impairing their drying properties. Another object is to improve the value of such drying oils as blending agents in other coating compositions. A further object is to effect decolorizing, deodorizing, and improvement without sacrifice in yield. Other objects will be apparent as the detailed description of the invention proceeds.

When chromophoric groups or color bodies are present in saturated hydrocarbons their removal is usually easy to accomplish by known methods. In the case of highly unsaturated hydrocarbons, however, a difficult problem is presented because conventional methods of color improvement, although applicable to a certain extent in some cases, have many disadvantages and usually result in loss of valuable material. We have discovered that it is possible to improve greatly the color and odor of polyolefinic hydrocarbon drying oils without appreciably changing the iodine number thereof and without detrimental effect on the desirable drying properties. We have produced this result by effecting a selective hydrogenation of components which are responsible for the dark color, said hydrogenation being sufficiently mild so that the iodine number of the oils is not materially decreased. The exact amount of hydrogenation required is dependent to a certain extent on the nature of the polyolefinic hydrocarbon. In the case of those produced by hydrolizing HF complex resulting from HF cracking of dearomatized gas oil (or other high boiling hydrocarbon substantially free from aromatics, such for example as paraffins, olefins, olefin polymers, and mixtures of any such hydrocarbons boiling above about 400° F.) the hydrogenation should be limited to effect saturation of less than 15%, usually less than 10% and preferably less than 5% of the double bonds indicated by iodine number. In the case of clay polymer the hydrogenation should be limited to effect saturation of less than 30%, usually less than 20% and preferably less than 10% of the unsaturation measured by iodine number.

Generally speaking, the polyolefinic hydrocarbon drying oils should be characterized by a Saybolt Universal viscosity of about 50 to 900 seconds at 100° F., a boiling range at 1 mm. pressure of about 100 to 300° C. and an average molecular weight in the range of 200 to 350 or more with an iodine number (centigrams of iodine absorbed per gram of oil) of at least about 140. The following table sets forth properties of representative polyolefinic hydrocarbon drying oils:

Table

| | From HF Cracking of Dearomatized East Texas Gas Oil | Clay Polymer Distillate |
|---|---|---|
| Boiling Range, °C. at 1 mm. Hg | 106–185 | 104–225 |
| Refractive Index at 25° C | 1.5178 | 1.5365 |
| Specific Dispersion | 150 | 170 |
| Specific Gravity | 0.9274 | 0.969 |
| Iodine Number | [1] 435–485 | [1] 185–200 |
| Maleic Anhydride Value (M. A. V.) | [1] 300–450 | [1] 20–35 |
| Per Cent Conjugation (from M. A. V.) | [2] 75–100% | [2] 5–10% |
| Approximate Mol. Weight | 225±15 | 300±20 |
| Viscosity at 100° F. Saybolt Universal Sec. | [1] 75–150 | [1] 190–400 |

[1] Range observed for various samples.
[2] Calculated as per cent of one pair of double bonds in conjugation although there are three or four double bonds present in the molecule.

From the above table it will be noted that the polyolefinic hydrocarbon drying oils from HF cracking of dearomatized gas oil differ remarkably from clay polymer drying oils. From the refractive index and specific dispersion it will be seen that they contain less aromatics, i. e. a greater proportion of chain structure to ring structure. Their iodine number is surprisingly high. Their maleic anhydride value and percent conjugation is also outstanding and remarkable and has been confirmed by ultraviolet spectrophotometric observations. Apparently the polyolefinic hydrocarbon drying oils produced by HF cracking of dearomatized gas oil are composed chiefly of polyolefins containing 4 to 5 double bonds per molecule with 75 to 100% of the material containing at least one pair of conjugated double bonds. This is a very unusual combination of properties.

Polyolefinic hydrocarbon drying oils may be produced by dearomatizing a gas oil with sulfuric acid or selective solvent to reduce its aromatic content to a value less than about 1%, cracking said dearomatized gas oil with HF at a temperature in the range of about 250 to about 450° F., preferably about 300 to 350° F., under a pressure sufficient to maintain liquid phase conditions with an HF:oil charge ratio in the range of about .2:1 to 5:1, preferably 1:1 to 3:1 or about 2:1 and with a time of contact of the order of about 3 to 30, e. g. about 20 minutes. The reaction mixture should be maintained in intimate contact during the conversion step after which the mixture is cooled and separated into an HF-insoluble oil layer and an acid layer containing HF-soluble material. Most of the HF may be removed from the acid layer by stripping with an inert gas at a temperature below about 250° F. but any such stripping operation should be carefully controlled to avoid decomposition of the HF-polyolefinic hydrocarbon complex which is produced. At least 1 and preferably 1½ to 2 mols of HF should be left in the stripped residue for each mol of double bonds present; for practical purposes this means that the stripped residue should contain at least about 30% and preferably about 35 to 50% by weight of HF. This stripped complex may then be hydrolized by introducing it into an aqueous ammonia solution containing cracked ice or it may be hydrolized with water or an aqueous HF solution having an HF-water weight ratio in the range of about 2:1 to about 1:2. After the hydrolysis step any residual amounts of HF are removed by neutralization with a base, preferably an aqueous caustic solution, after which the HF-free polyolefinic hydrocarbon may be dried and distilled under reduced pressure to give various overhead fractions and undistilled residue or bottoms. The total polyolefin product may constitute from 20 to 25% of the dearomatized gas oil charge and this product may be roughly characterized as follows:

| Fraction | Per Cent of Product | Iodine Number |
|---|---|---|
| Gasoline Boiling Range | 17 | 525 |
| Gas Oil Boiling Range | 48 | 485 |
| Heavier-than-Gas Oil Boiling Range | 12 | 445 |
| Undistilled Residue | 23 | 348 |

In the following table charge A is the total polyolefinic hydrocarbon oil obtained by ammonia neutralization of the acid phase produced by cracking a dearomatized gas oil at 320° F. with a 2:1 HF:oil ratio and 20 minute contact time; charge B is the overhead (85.5 weight percent) obtained by vacuum distillation of a portion of charge A up to a maximum temperature of 428° F. at 1 mm. pressure. It will be noted that while both charge A and charge B were characterized by remarkably high iodine numbers they were dark in color, charge A having an N. P. A. color of 8 when diluted in 5 parts of kerosene and charge B having undiluted N. P. A. color of 4½. Both charges were hydrogenated with 10% by wt. Raney nickel as a catalyst under 600 pounds initial hydrogen pressure, charge A being contacted at about 390° F. for 60 minutes and reaching a maximum pressure of 825 p. s. i. and charge B being contacted for about 30 minutes at 320° F. with a maximum pressure of about 625 p. s. i. The composition of the charges before and after the partial hydrogenation step in each instance is shown by the following tables:

|  | Charge A | Final Product |
|---|---|---|
| Specific Gravity | .9110 | .8932. |
| Refractive Index | 1.5160 | 1.4970. |
| Iodine Number | 455 | 466. |
| Color (Gardner) | 18} For 1 part of oil in 5 parts kerosene. | 14} Undiluted. |
| Color (N. P. A.) | +8} | 4½} |
| Viscosity (Gardner) | A-4 | A-4. |
| Viscosity (CS) at 25° C | 6.24 | 6.24. |
| Specific Dispersion | 139 | 136. |

|  | Charge B | Final Product |
|---|---|---|
| Specific Gravity | .9005 | .8855. |
| Refractive Index | 1.5100 | 1.4910. |
| Iodine Number | 485 | 481. |
| Color (Gardner) | 14} Undiluted | 8} Undiluted. |
| Color (N. P. A.) | 4½} | 2½} |
| Viscosity (Gardner) | A-4 | A-4. |
| Viscosity (CS) at 25° C | 6.24 | 6.24. |
| Specific Dispersion | 158 | 143. |

From the above data it will be seen that the color of charge A was improved to 4½ N. P. A. undiluted and that the final product was characterized by a slightly lower specific gravity and refractive index, a slightly higher iodine number and substantially unchanged viscosity and specific dispersion. Charge B was likewise converted into a product of lower specific gravity and refractive index and substantially unchanged viscosity and its iodine number was not appreciably altered (going from 485 to 481) while its color was markedly improved from 4½ N. P. A. to 2½ N. P. A. It is remarkable that so great an improvement in color is obtainable with so little saturation of double bonds. When charge B was hydrogenated with Raney nickel catalyst at atmospheric pressure and at 350° F. for a period of about 3 hours, substantially the same color improvement was obtained but the final product had a refractive index of 1.5100 and an iodine number of 430.

While Raney nickel was employed as a hydrogenation catalyst in the above examples it should be understood that other hydrogenation catalysts may be used. The so-called sulfur-resistant hydrogenation catalysts, such as molybdenum sulfide, may have a longer catalyst life than Raney nickel. No invention is claimed in the hydrogenation catalyst per se since such catalysts are well known to those skilled in the art. An important feature of this invention is that of limiting the hydrogenation to such an extent that less than 10–15% of the double bonds are saturated, preferably less than about 2–5%. The type of catalyst, time, temperature and pressure of hydrogenation may thus be varied over a wide range of known conditions provided only that the extent of hydrogenation be limited to avoid any appreciable saturation of the double bonds. By limiting the hydrogenation to obtain about 1 to 5% saturation but not more than 10 to 15% saturation, the drying properties of the oil are not appreciably impaired and the partially hydrogenated product when applied as a coating, dries over night to give a hard film.

Another example of our invention is illustrated by the decolorizing of polyolefinic drying oil obtained by the distillation of the so-called "clay polymer," i. e. the product separated from contact material, such as active clays, after unrefined cracked hydrocarbon vapors are contacted therewith at temperatures in the range of 200 to 700° F. A drying oil fraction of such material boiling in the range of 60° C. to 245° C. at 2 mm. was found to have specific gravity of 0.9587, a refractive index of 1.5405, an iodine number of 208, and a dark, green-black color. After hydrogenation for one-half hour at about 150–160° C. at atmospheric pressure with 30% of a conventional hydrogenation catalyst consisting of nickel deposited on an inert carrier, the refractive index was 1.5350, the iodine number was still about 208 but the color was somewhat lighter although still quite dark (approximately 8 N. P. A.). When hydrogenation was continued under the same conditions for a period of about an hour, however, the refractive index was 1.5332, the iodine number 197 (4.3% reduction) and the color was reduced to approximately 4½ N. P. A. When the hydrogenation under said conditions was continued for two hours, the refractive index was 1.5291, the iodine number was 170 (18.2% reduction) and the color was 2½ N. P. A. It is most remarkable that so great a color improvement could be obtained with such a slight change in iodine number. The partially hydrogenated drying oils were found to have drying properties substantially as good as the original material. They were characterized by a pleasant and somewhat sweet odor instead of the offensive odor characteristic of the original material. It appears that for this type of polyolefin the hydrogenation may be somewhat more extensive, but even here it should be less than that required to effect 20 to 30% saturation.

It should be understood that the decolorized drying oils are useful per se in certain types of coating compositions and that conventional dryers and accelerators may be employed therewith and that they may be blended in various proportions with other drying oils or coating compositions to obtain films or coatings of desired properties.

We claim:

1. The method of improving the color of a dark colored hydrocarbon drying oil consisting essentially of polyolefins containing ring structure, rendered dark colored because of the presence of selectively hydrogenatable chromophoric components, and characterized by an average molecular weight in the range of 200 to 350, an iodine number in the range of about 185 to 550, and a maleic anhydride value in the range of about 20 to 450, which method comprises contacting said oil with hydrogen in the presence of a solid hydrogenation catalyst under mild hydrogenation conditions, and employing a time of contact sufficient to effect hydrogenation of at least a substantial portion of the chromophoric components but insufficient to effect a decrease in the iodine number of said hydrocarbon drying oil by as much as 20 per cent.

2. The method of claim 1 wherein the hydrocarbon drying oil is a dark colored clay polymer distillate characterized by a refractive index of about 1.53, a specific dispersion of about 170, a specific gravity of about .97, an iodine number of about 185 to 200 and a maleic anhydride value of about 20 to 35.

3. The method of claim 1 wherein the hydrocarbon drying oil is a dark colored product produced by treating an aromatic-free hydrocarbon charging stock with hydrogen fluoride and hydrolyzing the resulting complex, said product being characterized by a refractive index of about 1.51, a specific dispersion of about 150, a specific gravity of about .92, an iodine number of about 435 to 485, and a maleic anhydride value of about 300 to 450, wherein the hydrogenation is limited to effect saturation of less than 10 per cent of the double bonds indicated by iodine number.

4. The method of claim 1 which includes the steps of employing a nickel catalyst at a temperature in the range of 300° to 400° F. and under a pressure in the range of atmospheric to 825 pounds per square inch in the contacting step.

PAUL D. MAY.
LEON M. ADAMS.
ROBERT J. LEE.

REFERENCES CITED

The following references are of record in the file of this patent:

UNITED STATES PATENTS

| Number | Name | Date |
|---|---|---|
| 1,812,849 | Collins | June 30, 1931 |
| 1,903,501 | Calcott et al. | Apr. 11, 1933 |
| 2,167,067 | Gubelmann et al. | July 25, 1939 |
| 2,400,521 | Kuhn | May 21, 1946 |
| 2,439,729 | Guinot | Apr. 13, 1948 |
| 2,443,079 | Otto | June 8, 1948 |
| 2,473,206 | Jones | June 14, 1948 |